US009465694B2

(12) United States Patent
Hwang et al.

(10) Patent No.: US 9,465,694 B2
(45) Date of Patent: Oct. 11, 2016

(54) METHOD AND APPARATUS FOR RECOVERING PARTITION BASED ON FILE SYSTEM METADATA

(71) Applicant: ELECTRONICS AND TELECOMMUNICATIONS RESEARCH INSTITUTE, Daejeon (KR)

(72) Inventors: Hyunuk Hwang, Daejeon (KR); Kibom Kim, Daejeon (KR); Seungyong Lee, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 119 days.

(21) Appl. No.: 14/547,248

(22) Filed: Nov. 19, 2014

(65) Prior Publication Data

US 2016/0077918 A1 Mar. 17, 2016

(30) Foreign Application Priority Data

Sep. 16, 2014 (KR) .................. 10-2014-0122563

(51) Int. Cl.
*G06F 11/00* (2006.01)
*G06F 11/14* (2006.01)
*G06F 11/20* (2006.01)

(52) U.S. Cl.
CPC ....... *G06F 11/1435* (2013.01); *G06F 11/1451* (2013.01); *G06F 11/1469* (2013.01);
(Continued)

(58) Field of Classification Search
CPC .................................................. G06F 11/2058
USPC .................................... 714/6.23, 15, 16, 20
See application file for complete search history.

(56) References Cited

U.S. PATENT DOCUMENTS 8,006,125 B1 * 8/2011 Meng .................. G06F 11/1417
714/6.2
2004/0153724 A1 * 8/2004 Nicholson ........... G06F 11/0709
714/6.11
(Continued)

FOREIGN PATENT DOCUMENTS

KR 10-0308873 B1 11/2001
KR 10-2008-0107629 A 12/2008
(Continued)

OTHER PUBLICATIONS

Soon Hwan Kim et al., "NTFS File System Recovery," Journal of Korean Institute of Information Scientists and Engineers, vol. 31, No. 2, (https://dbpia.co.kr/Journal/ArticleDetail/446046) Oct. 2004.
(Continued)

*Primary Examiner* — Dieu-Minh Le
(74) *Attorney, Agent, or Firm* — LRK Patent Law Firm

(57) ABSTRACT

A method and apparatus for recovering a partition based on file system metadata, which calculate core information necessary for the recovery of a partition using only the MFT entry information of $MFT and recover a deleted partition when an MBR and a GPT that correspond to the partition configuration information of a disk and a BR and a BBR that store the configuration information of a volume are deleted or destroyed. The method includes determining an unallocated area in a disk or an evidence image, collecting MFT entries from the unallocated area, generating MFT partition candidate information by analyzing the MFT entries, and creating information enabling a layout of a partition to be reconfigured based on the MFT partition candidate information, and creating a tree structure using the created information and the MFT entries.

16 Claims, 15 Drawing Sheets

(52) U.S. Cl.
CPC ....... *G06F11/2058* (2013.01); *G06F 11/2069* (2013.01); *G06F 11/1417* (2013.01); *G06F 2201/84* (2013.01)

(56) References Cited

U.S. PATENT DOCUMENTS

| | | | |
|---|---|---|---|
| 2005/0193035 A1* | 9/2005 | Byrne | G06F 11/1471 |
| 2010/0332744 A1* | 12/2010 | Khosravi | G06F 21/6218 711/112 |
| 2011/0055163 A1 | 3/2011 | Hwang et al. | |
| 2011/0202794 A1* | 8/2011 | Kim | G06F 11/1417 714/15 |
| 2012/0066546 A1 | 3/2012 | Kim | |
| 2014/0059313 A1 | 2/2014 | Hwang et al. | |

FOREIGN PATENT DOCUMENTS

| | | |
|---|---|---|
| KR | 10-2011-0021125 A | 3/2011 |
| KR | 10-2011-0094468 A | 8/2011 |
| KR | 10-2014-0026821 A | 3/2014 |
| WO | 01/27860 A2 | 4/2001 |

OTHER PUBLICATIONS

Jaeung Namgung et al., "A research for partition recovery method in a forensic perspective," Journal of the Korea Institute of Information Security & Cryptology (JKIISC), vol. 23, No. 4, Aug. 2013, Republic of Korea.

Jong-Hyuk Park, "File System and File Recovery (Introduction of File System)," UCS Lab, Dec. 31, 2012.

* cited by examiner

| ENTRY # | NAME | DESCRIPTION |
|---|---|---|
| 0 | $MFT | FILE CONTAINING MFT INFORMATION |
| 1 | $MFTMirr | BACKUP COPY OF $MFT FILE |
| 2 | $LogFile | CONTAIN TRANSACTION JOURNAL RECORD |
| 3 | $Volume | CONTAIN INFORMATION ABOUT VOLUME, SUCH AS LABEL AND VERSION OF VOLUME |
| 4 | $AttrDef | CONTAIN VARIOUS ATTRIBUTE VALUES, SUCH AS PARAMETER VALUES, NAMES AND SIZES |
| 5 | . (Dot) | CONTAIN ROOT DIRECTORY OF FILE SYSTEM |
| 6 | $Bitmap | CONTAIN CLUSTER ALLOCATION MANAGEMENT INFORMATION OF FILE SYSTEM |
| 7 | $Boot | CONTAIN INFORMATION ABOUT BOOT RECORD AREA |
| 8 | $BadClus | CONTAIN INFORMATION ABOUT BAD CLUSTERS |
| 9 | $Secure | CONTAIN INFORMATION ABOUT SECURITY AND ACCESS RIGHT OF FILES |
| 10 | $Upcase | CONTAIN ALL UNICODE UPPERCASE CHARACTERS |
| 11 | $Extend | DIRECTORY CONTAINING OPTIONAL EXTENSIONS, AND FILES ARE NOT PRESENT IN DIRECTORY IN MS |
| 12~15 | <Unused> | NOT USED |
| 16~23 | <Unused> | NOT USED |
| ANY | $Objid | CONTAIN UNIQUE ID INFORMATION OF FILE |
| ANY | $Quota | CONTAIN INFORMATION ABOUT AMOUNT USED (QUOTA) |
| ANY | $Reparse | CONTAIN INFORMATION ABOUT REPARSE POINTS |
| ANY | $Usnjrnl | FILE STORING RECORDS WHEN FILE OR DIRECTORY IS CHANGED |

FIG. 11

| OFFSET | NAME | DESCRIPTION |
|---|---|---|
| 0~3 | SIGNATURE | 'FILE' CHARACTER STRING |
| 4~5 | OFFSET OF FIXUP ARRAY | LOCATION OF FIXUP ARRAY |
| 6~7 | COUNT OF FIXUP VALUE | NUMBER OF ITEMS IN FIXUP ARRAY |
| 8~15 | LOGFILE SEQUENCE NUMBER | LOCATION VALUE OF TRANSACTION |
| 16~17 | SEQUENCE VALUE | SEQUENCE VALUE |
| 18~19 | HARD LINK COUNT | NUMBER OF HARD LINKS |
| 20~21 | OFFSET TO FIRST ATTRIBUTE | OFFSET AT WHICH FIRST ATTRIBUTE STARTS |
| 22~23 | FLAGS | STATUS OR ATTRIBUTE INFORMATION OF MFT ENTRY |
| 24~27 | USED SIZE OF MFT ENTRY | ACTUALLY USED SIZE OF MFT ENTRY |
| 28~31 | ALLOCATED SIZE OF MFT ENTRY | MFT ENTRY ALLOCATION SIZE, 1024 BYTES |
| 32~39 | FILE REFERENCE TO BASE MFT ENTRY | IN CASE OF NON-BASE MFT ENTRY, FILE REFERENCE ADDRESS OF BASE MFT ENTRY |
| 40~41 | NEXT ATTRIBUTE ID | IDS OF ATTRIBUTES ALLOCATED ONLY IN MFT ENTRY |
| 42~43 | PADDING | PADDING WITH 00 00 |
| 44~47 | $MFT RECORD NUMBER | MFT IDENTIFIER |

FIG. 12

| OFFSET | NAME | DESCRIPTION |
|---|---|---|
| 0~3 | ATTRIBUTE IDENTIFIER CODE | ATTRIBUTE HEADER |
| 4~7 | LENGTH OF ATTRIBUTE | ATTRIBUTE LENGTH |
| 8~8 | NON-RESIDENT FLAG | NON-RESIDENT FLAG |
| 9~9 | LENGTH OF NAME | LENGTH OF ATTRIBUTE NAME |
| 10~11 | OFFSET TO NAME | ATTRIBUTE NAME LOCATION |
| 12~13 | FLAGS | VARIOUS STATUS FLAGS OF ATTRIBUTES (COMPRESSION, ENCRYPTION, SPARSE) |
| 14~15 | ATTRIBUTE IDENTIFIER | UNIQUE ATTRIBUTE VALUE |
| RESIDENT ATTRIBUTES(USE WHEN NON-RESIDENT FLAG IS '00') | | |
| 16~19 | SIZE OF CONTENT | SIZE OF ATTRIBUTE CONTENT |
| 20~21 | OFFSET TO CONTENT | STARTING LOCATION OF ATTRIBUTE CONTENT |
| 22~22 | INDEXED FLAG | FLAG INDICATING WHETHER GIVEN ATTRIBUTE IS ATTRIBUTE USED FOR SEARCHING |
| 23~23 | PADDING | PADDING |
| 24~ | NAME OF ATTRIBUTE(NAMED ATTRIBUTE) | NAME OF ATTRIBUTE |
| 24~ | START OF ATTRIBUTE(UN-NAMED ATTRIBUTE) | START OF ATTRIBUTE |
| NON-RESIDENT ATTRIBUTES(USE WHEN NON-RESIDENT FLAG IS '01') | | |
| 16~23 | STARTING VCN OF THE RUNLIST | STARTING VCN OF RUN LIST |
| 24~31 | ENDING VCN OF THE RUNLIST | ENDING VCN OF RUN LIST |
| 32~33 | OFFSET TO OF THE RUNLIST | LOCATION OF RUN LIST |
| 34~35 | COMPRESSION UNIT SIZE | SIZE OF COMPRESSION UNIT |
| 36~39 | PADDING | PADDING |
| 40~47 | ALLOCATED SIZE OF ATTRIBUTE CONTENT | TOTAL SIZE OF CLUSTER TO WHICH ATTRIBUTE DATA IS ALLOCATED (BYTES UNIT) |
| 48~55 | REAL SIZE OF ATTRIBUTE CONTENT | REAL TOTAL CLUSTER SIZE OF ATTRIBUTE DATA |
| 56~63 | INITIALIZED SIZE OF ATTRIBUTE CONTENT | INITIALIZED TOTAL CLUSTER SIZE OF ATTRIBUTE DATA (BYTES UNIT) |
| 64~ | CLUSTER DATA RUN LIST (UNNAMED STREAM) | RUN LIST |
| 64~ | ATTRIBUTE NAME(NAMED STREAM) | ATTRIBUTE NAME |

FIG. 13

| OFFSET | NAME | DESCRIPTION |
|---|---|---|
| ~ | ~ | ATTRIBUTE HEADER |
| 0~7 | PARENT DIRECTORY REFERENCE | FILE REFERENCE ADDRESS OF PARENT DIRECTORY |
| 8~15 | FILE CREATED DATE TIME STAMP | CREATION TIME |
| 16~23 | FILE MODIFIED DATE TIME STAMP | MODIFICATION TIME |
| 24~31 | ENTRY MODIFIED DATE TIME STAMP | MFT MODIFICATION TIME |
| 32~39 | LAST ACCESSED DATE TIME STAMP | ACCESS TIME |
| 40~47 | PHYSICAL FILE SIZE | ALLOCATION SIZE OF FILE |
| 48~55 | LOGICAL FILE SIZE | REAL SIZE OF FILE |
| 56~59 | DOS FILE ATTRIBUTES | FLAG |
| 60~63 | EXTENDED ATTRIBUTES/REPARSE | REPARSE VALUE |
| 64~64 | FILE NAME LENGTH (NUMBER OF CHARACTER) | NAME LENGTH |
| 65~65 | NAMESPACE TYPE | NAME FORMAT<br>00 - POSIX<br>01 - WIN32<br>02 - DOS SHORT FILE NAME<br>03 - IDENTICAL IN WIN32/DOS |
| 66~ | FILE NAME(UNICODE) | NAME |

FIG. 14

| N-TH PRESENT BYTE | CORRESPONDING CLUSTER |
|---|---|
| 00000001 | (N x 8) − TH CLUSTER |
| 00000010 | (N x 8) + 1 − TH CLUSTER |
| 00000100 | (N x 8) + 2 − TH CLUSTER |
| 00001000 | (N x 8) + 3 − TH CLUSTER |
| 00010000 | (N x 8) + 4 − TH CLUSTER |
| 00100000 | (N x 8) + 5 − TH CLUSTER |
| 01000000 | (N x 8) + 6 − TH CLUSTER |
| 10000000 | (N x 8) + 7 − TH CLUSTER |

FIG. 15

METHOD AND APPARATUS FOR RECOVERING PARTITION BASED ON FILE SYSTEM METADATA

CROSS REFERENCE TO RELATED APPLICATION

This application claims the benefit of Korean Patent Application No. 10-2014-0122563, filed Sep. 16, 2014, which is hereby incorporated by reference in its entirety into this application.

BACKGROUND OF THE INVENTION

1. Technical Field

The present invention relates generally to a method and apparatus for recovering a partition based on file system metadata and, more particularly, to a method and apparatus for recovering a partition using metadata in which the principal information of a file system is stored, in a situation in which the partition configuration information of a disk is not present.

2. Description of the Related Art

The partitions of a computer storage device are managed via a Master Boot Record (MBR) or a Globally Unique Identifier (GUID) Partition Table (GPT).

When an MBR or a GPT is analyzed, the location of a boot record for managing information about a volume can be found. By means of information about the boot record, the basic information of each partition and the starting location of metadata information in a file can be found.

The malicious codes, used in the 3.20 and 6.25 cyber terror attacks in South Korea in 2013 to destroy hard disks, may destroy core information for the partition configuration of a disk, such as an MBR, a GPT, and a boot record. Due thereto, even if actual contents of a file are not completely deleted, the effect of destroying data and a disk may be exhibited. That is, as shown in FIG. 1, the Master File Table (MFT) entries of $MFT, in which actual data information is stored, remain complete or are only partially damaged, but it is impossible to know the layout of a partition. Even if the address of a data cluster recorded in MFT data entries is obtained, a boot record, which is a reference point for the start of a volume, was already deleted. Therefore, exact data access is impossible with the address of a data cluster.

As shown in FIG. 1, when all of an MBR, a BR, and a Backup Boot Record (BBR) are deleted in a disk structure shown in an upper portion of FIG. 1, the disk structure is converted into and present as that shown in a lower portion of FIG. 1. In this case, when the data cluster number of a file having an MFT Identifier number of 100 is 15,000, a precise data location may be detected if the starting location of a volume is known. However, when a partition layout is not present, a reference point cannot be known, and thus a completely different location may be indicated, as in the disk structure shown in the lower portion.

As related preceding technology, Korean Patent Application Publication No. 2011-0021125 discloses technology for recovering a deleted partition using information found by searching for an existing undeleted boot record.

As another related preceding technology, Korean Patent Application Publication No. 2014-0026821 discloses technology for recovering deleted partition information by searching for a backup boot record that is backed up in a file system.

SUMMARY OF THE INVENTION

Accordingly, the present invention has been made keeping in mind the above problems occurring in the prior art, and an object of the present invention is to provide a method and apparatus for recovering a partition based on file system metadata, which calculate core information necessary for the recovery of a partition using only the MFT entry information of $MFT and recover a deleted partition when an MBR and a GPT that correspond to the partition configuration information of a disk and a BR and a BBR that store the configuration information of a volume are deleted or destroyed.

In accordance with an aspect of the present invention to accomplish the above object, there is provided a method for recovering a partition based on file system metadata, including determining, by an unallocated area determination unit, an unallocated area in a disk or an evidence image; collecting, by a Master File Table (MFT) entry collection unit, MFT entries from the unallocated area; generating, by an MFT entry analysis unit, MFT partition candidate information by analyzing the MFT entries; and creating, by an MFT partition creation unit, information enabling a layout of a partition to be reconfigured based on the MFT partition candidate information, and creating a tree structure using the created information and the MFT entries.

Determining the unallocated area may include classifying the disk or evidence image into an allocated area and an unallocated area, and representing each area by Linear Block Addressing (LBA)-based addresses.

Determining the unallocated area may include classifying the disk or evidence image into an allocated area and an unallocated area, and listing the unallocated area using LBA-based addresses.

Collecting the MFT entries may include determining the MFT entries based on a signature of an $MFT file while reading the unallocated area on a sector basis; and collecting the MFT entries while jumping by a size of MFT entries if the MFT entries are detected.

Generating the MFT partition candidate information by analyzing the MFT entries may include analyzing $FILE-NAME attributes of each MFT entry and then determining whether a file name is "$MFT"; if it is determined that the file name is "$MFT", determining whether an MFT identifier value of a header of the MFT entry is 0 (zero); if it is determined that the MFT identifier value of the MFT entry header is 0 (zero), determining that the $MFT file is present, and determining to which one of a data cluster of $MFT and a data cluster of $MFTMirr the determined $MFT file corresponds; and storing, as the MFT partition candidate information, results of determining to which one of the data cluster of $MFT and the data cluster of $MFTMirr the determined $MFT file corresponds.

Creating the tree structure may include reading the MFT partition candidate information and then accessing a corresponding sector; analyzing MFT entries of the corresponding sector and calculating a location of a boot record; if the location of the boot record has been calculated, calculating a total size of a volume using an MFT entry corresponding to a metadata file; determining whether the calculated volume size satisfies a preset minimum size; parsing the collected MFT entries if it is determined that the calculated volume size satisfies the preset minimum size; and restoring parsed results to a tree structure.

Calculating the location of the boot record may include analyzing MFT entry #0 of $MFT; accessing $DATA attributes of the MFT entry #0; calculating a file size of $MFT from a non-resident attribute header of the $DATA attributes by using a real attribute size item; analyzing a Cluster Run List from the non-resident attribute header of the $DATA attributes and obtaining a location value of a starting cluster of the $MFT and a total size value of clusters; and calculating a location of the boot record using the location value of the starting cluster of the $MFT and the total size value of the clusters.

Calculating the location of the boot record may include calculating a difference between a physical sector offset of a file starting location of the $MFT and an offset value obtained by converting the starting cluster of the $MFT into a sector offset, thus calculating the location of the boot record, which is a starting point of the volume.

Calculating the total size of the volume may include analyzing the MFT entry corresponding to the metadata file; obtaining information of the metadata file using a real attribute size item of a non-resident attribute header of $DATA attributes of the MFT entry; and calculating a total number of sectors of the volume based on the information of the metadata file.

The metadata file may be an undeleted metadata file from among a $Bitmap file corresponding to MFT entry #6, a dot (.) file corresponding to MFT entry #5, and a $BadClus file corresponding to MFT entry #8.

In accordance with another aspect of the present invention to accomplish the above object, there is provided an apparatus for recovering a partition based on file system metadata, including an unallocated area determination unit for determining an unallocated area in a disk or an evidence image; a Master File Table (MFT) entry collection unit for collecting MFT entries from the unallocated area; an MFT entry analysis unit for generating MFT partition candidate information by analyzing the MFT entries; and an MFT partition creation unit for creating information enabling a layout of a partition to be reconfigured based on the MFT partition candidate information, and creating a tree structure using the created information and the MFT entries.

BRIEF DESCRIPTION OF THE DRAWINGS

The above and other objects, features and advantages of the present invention will be more clearly understood from the following detailed description taken in conjunction with the accompanying drawings, in which:

FIG. 11 illustrates a table representing the types of metadata file;

FIG. 12 illustrates a table representing the structures of an MFT entry header;

FIG. 13 illustrates a table representing the structures of an attribute header present in MFT entries;

FIG. 14 illustrates a table representing the structure of $FILENAME attribute content; and FIG. 15 illustrates a table representing a scheme for calculating clusters mapped to the bytes of $Bitmap data.

DESCRIPTION OF THE PREFERRED EMBODIMENTS

Figure 1:
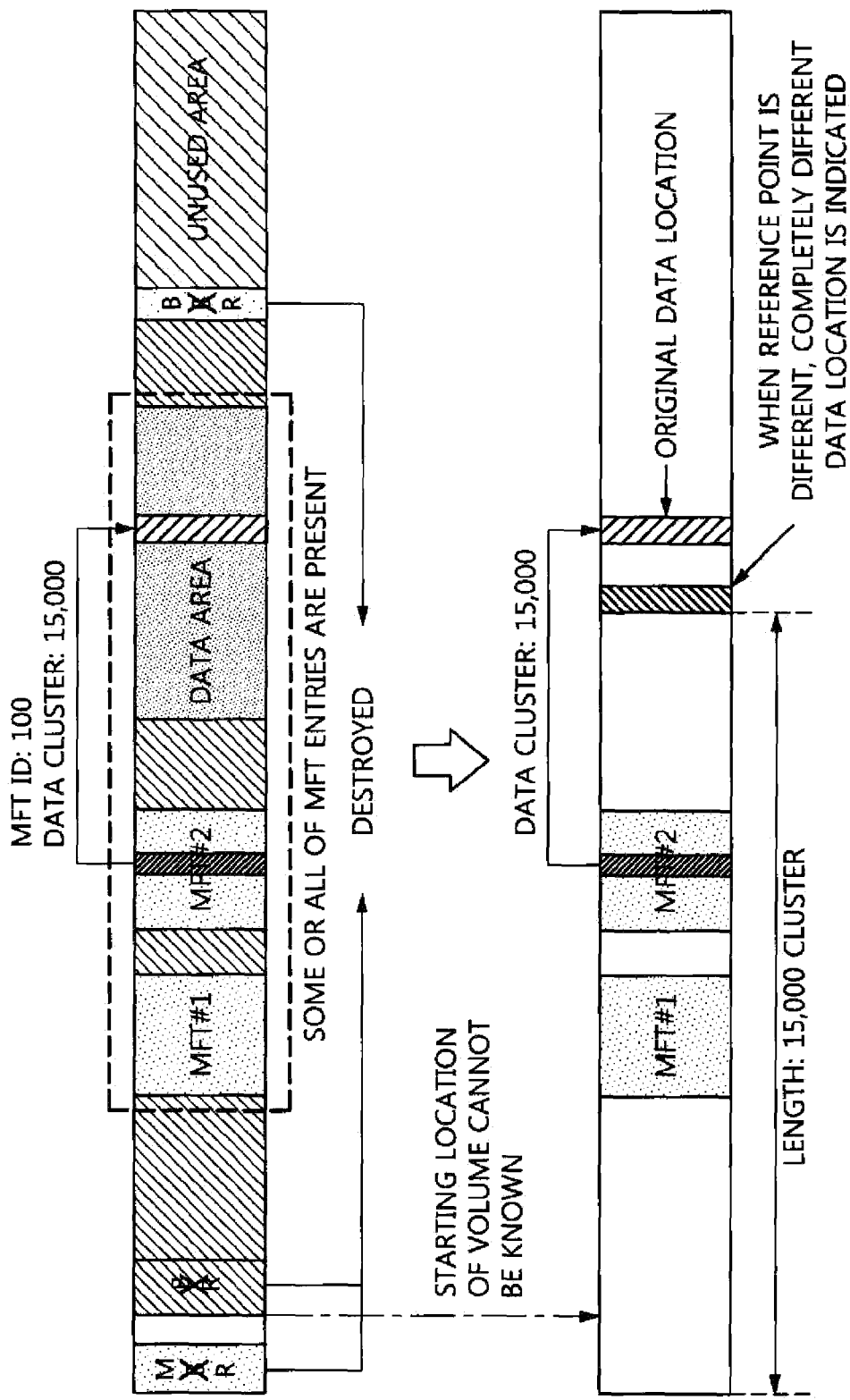
FIG. 1 is a diagram illustrating the status of a disk layout when a conventional disk is destroyed.

The present invention may be variously changed and may have various embodiments, and specific embodiments will be described in detail below with reference to the attached drawings.

However, it should be understood that those embodiments are not intended to limit the present invention to specific disclosure forms and they include all changes, equivalents or modifications included in the spirit and scope of the present invention.

The terms used in the present specification are merely used to describe specific embodiments and are not intended to limit the present invention. A singular expression includes a plural expression unless a description to the contrary is specifically pointed out in context. In the present specification, it should be understood that the terms such as "include" or "have" are merely intended to indicate that features, numbers, steps, operations, components, parts, or combinations thereof are present, and are not intended to exclude a possibility that one or more other features, numbers, steps, operations, components, parts, or combinations thereof will be present or added.

Unless differently defined, all terms used here including technical or scientific terms have the same meanings as the terms generally understood by those skilled in the art to which the present invention pertains. The terms identical to those defined in generally used dictionaries should be interpreted as having meanings identical to contextual meanings of the related art, and are not interpreted as being ideal or excessively formal meanings unless they are definitely defined in the present specification.

Embodiments of the present invention will be described in detail with reference to the accompanying drawings. In the following description of the present invention, the same reference numerals are used to designate the same or similar elements throughout the drawings and repeated descriptions of the same components will be omitted.

The present invention is characterized in that, for partition recovery, a partition is recovered based on the file metadata information of a file system not only in a situation in which a master boot record or a GPT is deleted or destroyed, but also in a situation in which a boot record or a backup boot record is deleted or destroyed.

In other words, the present invention calculates essential information enabling a partition to be reconfigured by using a method proposed in the present invention when MFT entries that maintain the information of a file remain in a New Technology File System (NTFS) in a situation in which the configuration information of the partition is destroyed and a file cannot be read, thus recovering the file. For this, the location of a boot record, the size of clusters, the total number of sectors in a volume, etc. are calculated by analyzing the attribute information of an $MFT file, and a deleted partition is recovered by restoring the layout of a partition. In the present invention, the partition created in this way is called an MFT partition.

Figure 2:
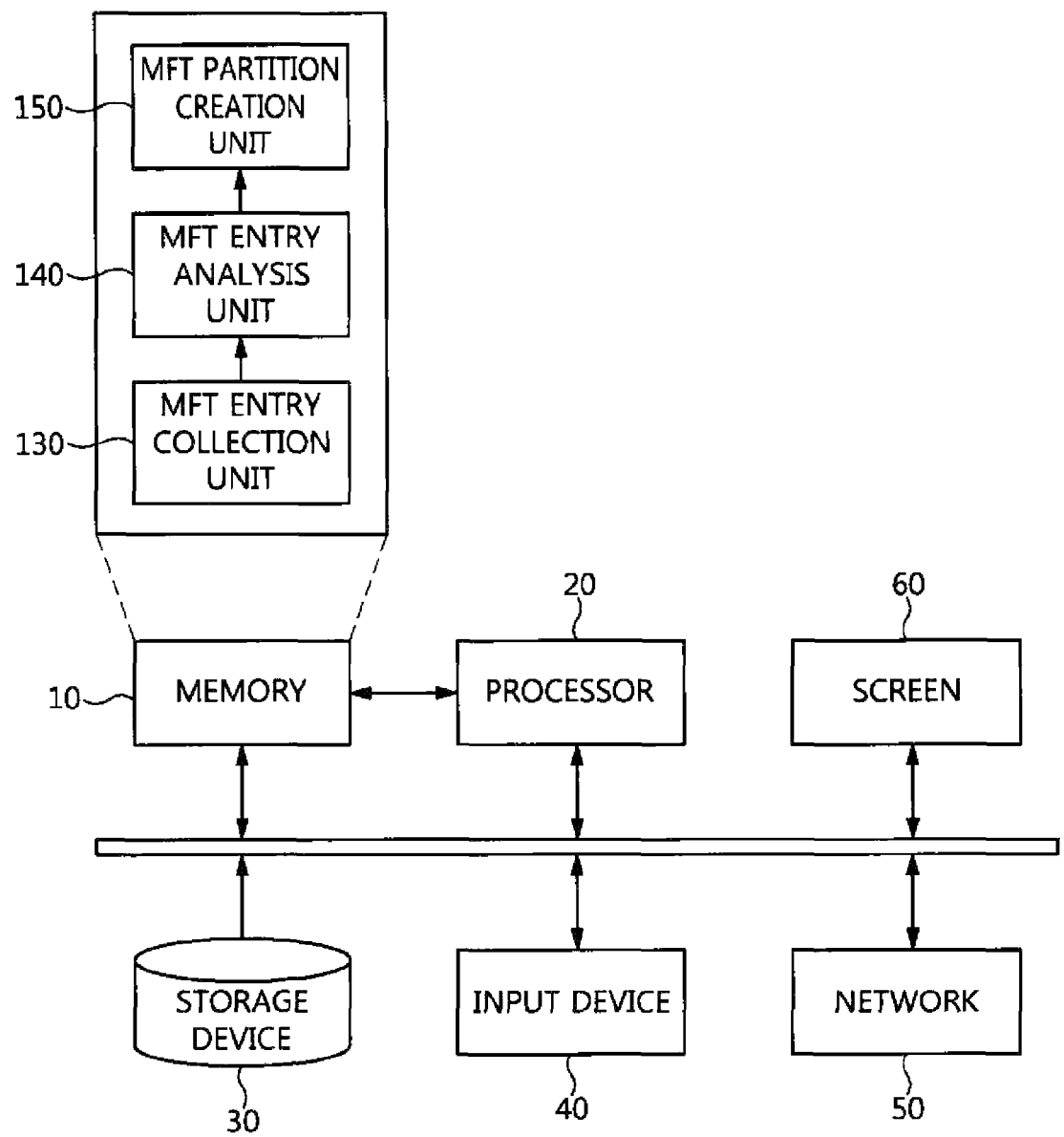
FIG. 2 is a configuration diagram showing a system for recovering a partition based on file system metadata to which the present invention is applied.

FIG. 2 is a configuration diagram showing a system for recovering a partition based on file system metadata to which the present invention is applied.

The system shown in FIG. 2 includes a memory 10, a processor 20, a storage device 30, an input device 40, a network 50, and a screen 60.

The memory 10 is a space in which an MFT entry collection unit 130, an MFT entry analysis unit 140, and an MFT partition creation unit 150 that are core modules for a partition recovery apparatus are loaded.

The processor 20 operates the modules 130, 140, and 150 loaded in the memory 10 in a multi-threaded manner.

The storage device 30 stores log and results output from a program in the form of a file.

The input device 40 is provided with a disk or an evidence image in which the recovery of a partition is to be attempted by a program. Here, the program is remotely operable even based on the network 50, and the results thereof are output and displayed on the screen 60.

Figure 3:
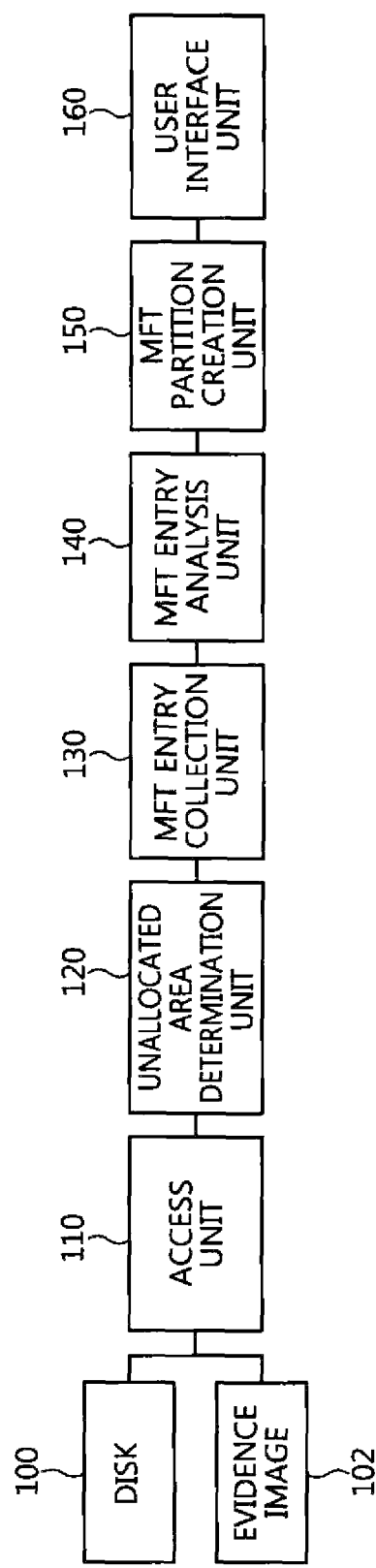
FIG. 3 is a configuration diagram showing an apparatus for recovering a partition based on file system metadata according to an embodiment of the present invention.
Figure 4:
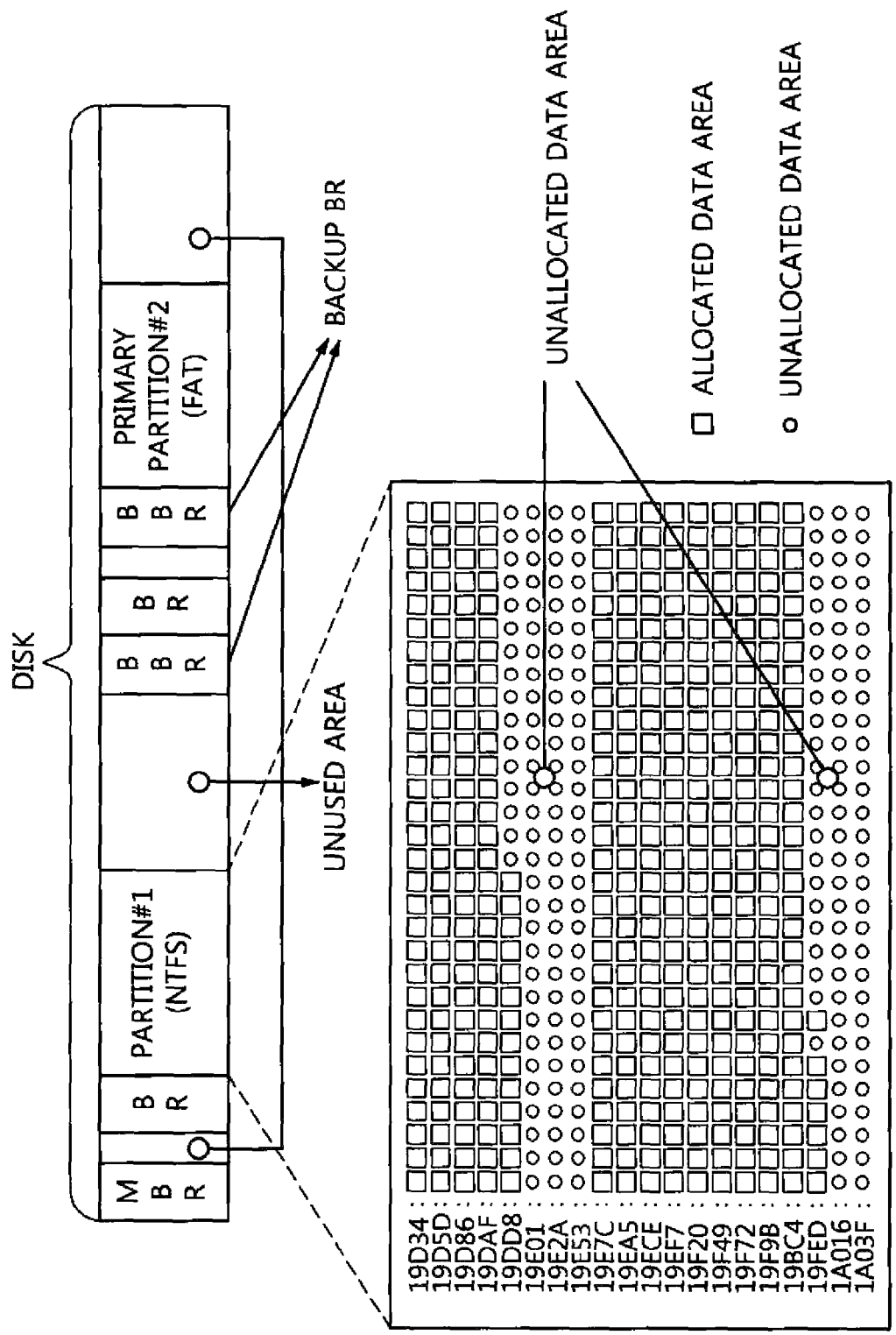
FIG. 4 is a diagram employed in the description of an unallocated area determination unit shown in FIG. 3.

FIG. 3 is a configuration diagram showing an apparatus for recovering a partition based on file system metadata according to an embodiment of the present invention, and FIG. 4 is a diagram employed in the description of an unallocated area determination unit shown in FIG. 3.

An apparatus for recovering a partition based on file system metadata according to an embodiment of the present invention includes an access unit 110, an unallocated area determination unit 120, an MFT entry collection unit 130, an MFT entry analysis unit 140, an MFT partition creation unit 150, and a user interface 160.

The access unit 110 may access data sources of digital forensics, that is, a hard disk 100 or an evidence image (a raw [DD] image, an Expert Witness Format [EWF] format, etc.) 102 that are the target of inquiry and investigation, and may read the data (that is, the disk 100 or the evidence image 102).

The unallocated area determination unit 120 may analyze a file system present in the hard disk 100 or the evidence image 102 and determine an unallocated area (see FIG. 4).

Referring to FIG. 4, the unallocated area will be described in detail. The unallocated area may be classified into two types. One type is an unused area, which is an area other than a currently present partition in the disk 100 or the evidence image 102. The unused area denotes an empty space between respective volumes or a space remaining after a last volume. The other type is an unallocated data area. The unallocated data area is an area in which data is not stored in a normal volume (in which data is not allocated).

In this way, the disk 100 or the evidence image 102 is classified into an allocated area and an unallocated area, wherein each area is indicated by Linear Block Addressing (LBA)-based addresses, thus configuring a sector map for the entire disk or entire evidence image. Due to this, the unallocated area may be determined. Unlike this, the disk 100 or the evidence image 102 may be classified into an allocated area and an unallocated area, and only the unallocated area may be listed using LBA-based addresses because a search target required to recover a deleted partition is the unallocated area. By means of this, the unallocated area may be simply determined. The unallocated area that is targeted in the present invention includes both an unused area and an unallocated data area. If all areas enabling a partition to be recognized, such as a master boot record or a GPT, are destroyed, the entire disk 100 or evidence image 102 is the target of the unallocated area.

In FIG. 3, the MFT entry collection unit 130 may determine MFT entries based on the signature of an $MFT file, that is, "FILE" character string (offsets 0 to 3), while reading the unallocated area on a sector basis. The MFT entry collection unit 130 may collect MFT entries while jumping by the size (typically, 1,024 bytes) of detected MFT entries if the MFT entries have been detected, and may store the information of the corresponding MFT entries.

The MFT entry analysis unit 140 may search for the data cluster of $MFT or $MFTMirr ($MFT Mirror) using the results stored by the MFT entry collection unit 130, and generate information about MFT partition candidates.

The MFT partition creation unit 150 may analyze MFT entries based on the MFT partition candidate information generated by the MFT entry analysis unit 140 and calculate the core information (for example, location) of a boot record enabling the layout of the partition to be reconfigured. Further, the MFT partition creation unit 150 may configure a virtual boot record and create volume information based on the calculated information. Furthermore, the MFT partition creation unit 150 may parse the MFT entries on a file basis, and create a tree structure of the file system. As the tree structure is created, a deleted or destroyed partition may be recovered.

The user interface unit 160 provides the function of adding the recovered partition as a virtual volume and allowing an investigator to use the virtual volume in the same manner as a normal volume.

In accordance with FIG. 3 described above, MFT entries are collected by searching the disk 100 or the evidence image 102 on a sector basis. Then, information of the MFT entries is analyzed and then core information enabling the layout of the partition to be reconfigured is calculated. Based on the information calculated in this way, the tree structure of the file system is created, and the virtual volume structure is configured, with the result that the partition may be recovered.

Figure 5:
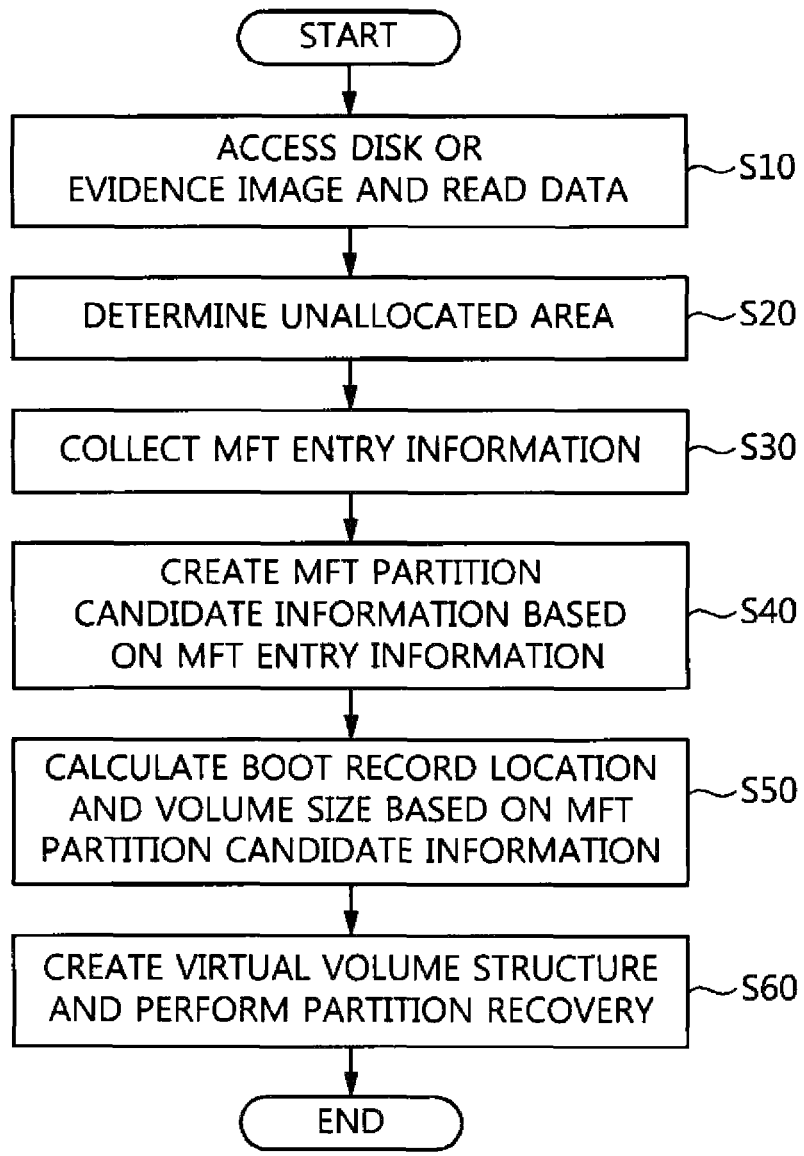
FIG. 5 is a flowchart showing a method for recovering a partition based on file system metadata according to an embodiment of the present invention.

FIG. 5 is a flowchart showing a method for recovering a partition based on file system metadata according to an embodiment of the present invention.

First, at step S10, the access unit 110 may access a data source and read data (that is, disk 100 or evidence image 102) from the data source.

At step S20, the unallocated area determination unit 120 analyzes a file system present in the disk 100 or the evidence image 102 and then determines an unallocated area.

At step S30, the MFT entry collection unit 130 collects MFT entries from the unallocated area determined by the unallocated area determination unit 120. The MFT entry collection unit 130 is operated in a multi-threaded manner depending on the environment of the system. Step S30 will be described in detail later with reference to FIG. 6.

At step S40, the MFT entry analysis unit 140 analyzes the MFT entries collected by the MFT entry collection unit 130 and generates MFT partition candidate information. Step S40 will be described in detail later with reference to FIG. 7.

At step S50, the MFT partition creation unit 150 calculates the location of a boot record and the size of a volume based on the MFT partition candidate information. Step S50 will be described in detail later with reference to FIG. 8.

Thereafter, at step S60, the MFT partition creation unit 150 parses the MFT entries on a file basis and then creates a tree structure (virtual volume structure), with the result that the recovery of the partition is performed. Step S60 will be described in detail later with reference to FIG. 8.

Figure 6:
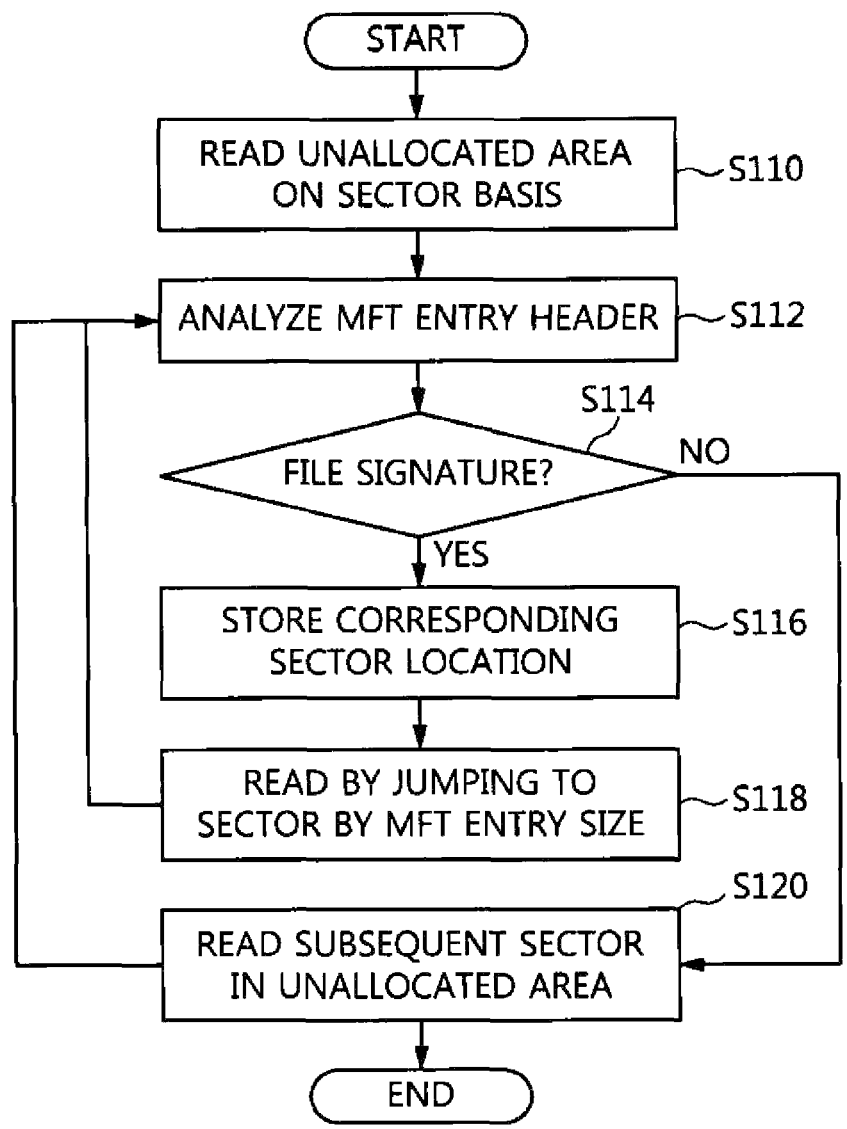
FIG. 6 is a flowchart showing in detail the step of collecting MFT entries in FIG. 5.

FIG. 6 is a flowchart showing, in detail, the step S30 of collecting MFT entries in FIG. 5. The MFT entry collection unit 130 is operated as in the flowchart of FIG. 6. The MFT entry collection step S30 is performed such that the MFT entry collection unit 130 searches each sector of the unallocated area for MFT entries based on a signature.

First, the unallocated area is read on a sector basis at step S110.

Then, the header of each MFT entry from the read sector is analyzed at step S112.

Thereafter, "FILE" character string (offsets 0 to 3) (see FIG. 12) that is the signature of the MFT entry header is searched for at step S114.

As a result of search, if the signature of the MFT entry header is correct (Yes at step S114), the location of the corresponding sector is stored in an MFT candidate table at step S116.

Thereafter, the location of a subsequent sector is read by jumping to the sector by the size of MFT entries and the process returns to step S112 where a procedure starting from step S112 is repeated at step S118.

The above-described operation is terminated after reading to the location of the last sector of the disk 100 or the evidence image 102 at step S120.

Figure 7:
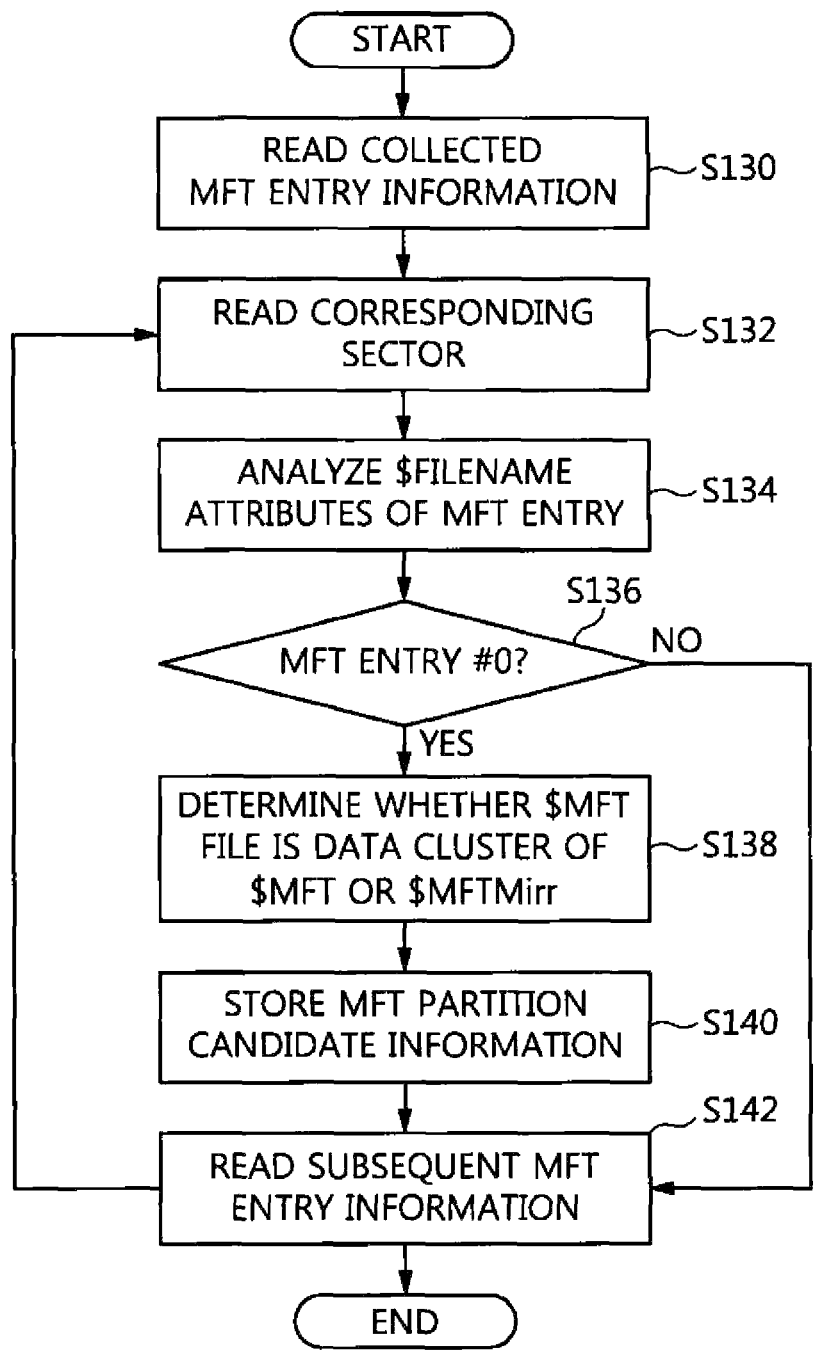
FIG. 7 is a flowchart showing, in greater detail, the step of generating MFT partition candidate information based on MFT entries in FIG. 5.

FIG. 7 is a flowchart showing in detail the step S40 of creating the MFT partition candidate information based on the MFT entries in FIG. 5. The MFT entry analysis unit 140 is operated as in the flowchart of FIG. 7.

First, the information of MFT entries collected by the MFT entry collection unit 130, that is, information of MFT entries stored in the MFT candidate table, is read at step S130, and the corresponding sector is accessed at step S132.

Thereafter, the $FILENAME attribute of each MFT entry is analyzed and it is determined whether a file name is "$MFT" (unicode type)(see FIG. 14) at step S134.

When the file name is "$MFT" (unicode type), it is determined whether the values of offsets 44 to 47 (see FIG. 12) are 0 (zero) at step S136.

When the values of offsets 44 to 47 are 0 (zero), it is determined that an $MFT file is present. Further, it is determined whether the determined $MFT file is the data cluster of $MFT or the data cluster of $MFTMirr at step S138. Here, the data cluster of the $MFTMirr includes four MFT entries, that is, $MFT, $MFTMirr, $LogFile, and $Volume. In other words, when determining whether only metadata files such as $MFT, $MFTMirr, $LogFile, and $Volume are present by searching for MFT entries, it may be easily determined if the $MFT file corresponds to the data cluster of $MFT or the data cluster of $MFTMirr. Information determined in this way is referred to as "MFT partition candidate information."

Further, the results of determination at step S138 are stored as the MFT partition candidate information in the MFT candidate table at step S140.

Next, after a subsequent MFT entry stored in the MFT candidate table has been read, a procedure starting from step S132 is repeated at step S142.

The above-described operation is terminated after reading to and processing the last entry of the MFT candidate table.

Figure 8:
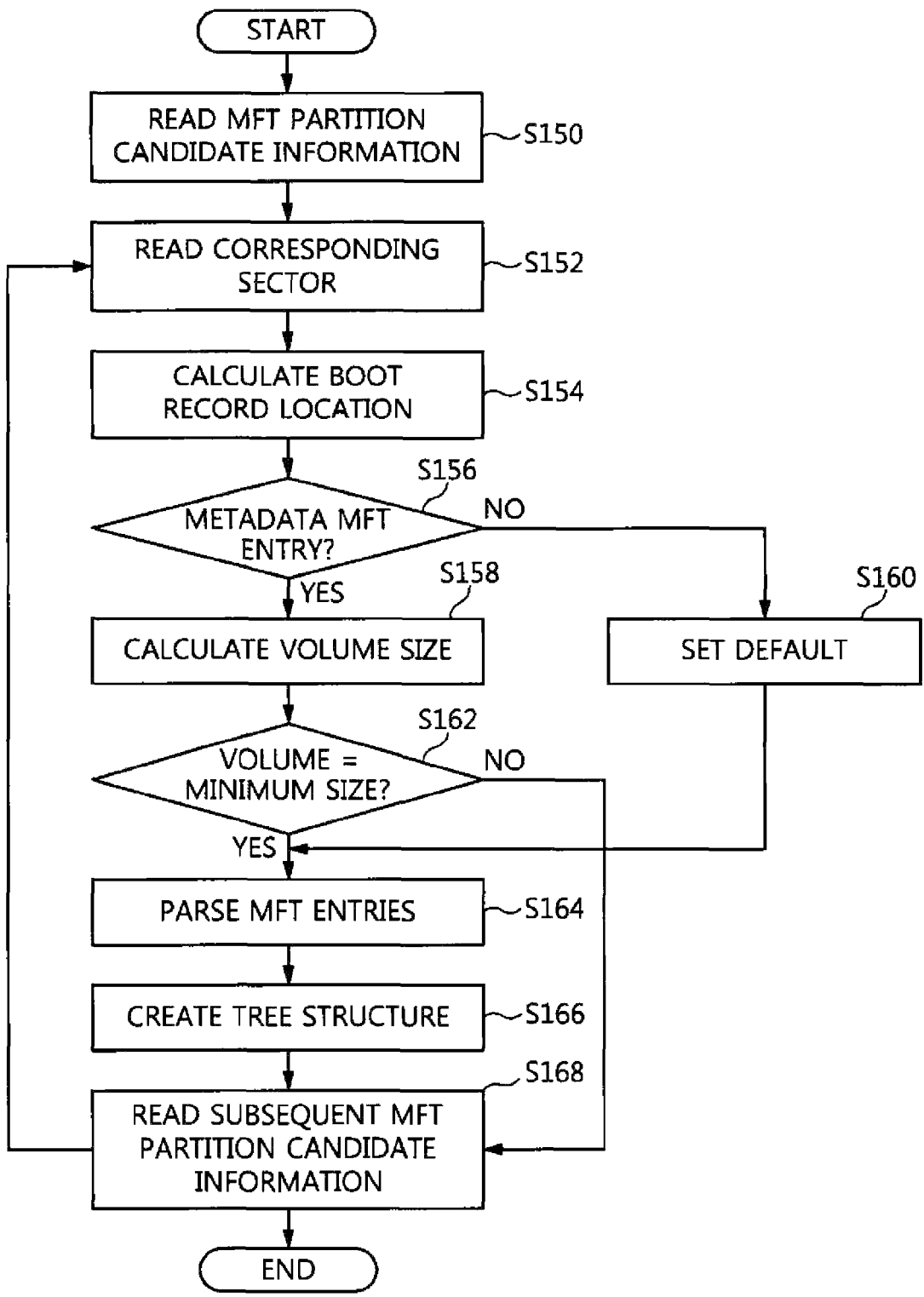
FIG. 8 is a flowchart showing, in greater detail, the step of calculating the location of a boot record and the size of a volume based on MFT partition candidate information and the step of creating a virtual volume structure and performing partition recovery in FIG. 5.

FIG. 8 is a flowchart showing in detail the step S50 of calculating the location of the boot record and the size of the volume based on the MFT partition candidate information and the step S60 of creating the virtual volume structure and performing the recovery of the partition in FIG. 5. The MFT partition creation unit 150 is operated as in the flowchart of FIG. 8.

First, MFT partition candidate information is read at step S150, and then the corresponding sector is accessed at step S152.

Next, the location of a boot record is calculated at step S154. Here, a method for calculating the location of the boot record will be described in detail later with reference to FIG. 9.

When the location of the boot record is calculated, it is determined whether there is a metadata MFT entry (e.g., $Bitmap or the like) to know the entire size of a volume at step S156.

When there is a metadata MFT entry, the size of the volume is calculated at step S158. In contrast, when there is no metadata MFT entry and it is impossible to calculate the total size of the volume, the size of an area ranging from the corresponding sector to a last sector is calculated, and the setting of defaults is performed so that the area may be calculated to have the maximum size at step S160. Here, the default size of the volume is set based on the size ranging from the corresponding sector to the last sector of the disk 100 or the evidence image 102. A method of calculating the size of the volume will be described in detail later with reference to FIG. 10.

After the size of the volume has been obtained in this way, it is checked whether the obtained volume size satisfies the preset minimum size of the volume at step S162.

If the obtained volume size satisfies the preset minimum size of the volume, MFT entries are parsed at step S164. Here, the minimum size of the volume may be designated based on 8 MB that is a minimum size enabling a partition to be created.

Then, based on the parsed MFT entries, a tree structure is created, and then a virtual volume that was not present is created at step S166.

Thereafter, subsequent MFT partition candidate information is read at step S168, and a procedure starting from step S152 is repeated.

Further, if no additional MFT partition candidate information is present, the process is terminated.

Figure 9:
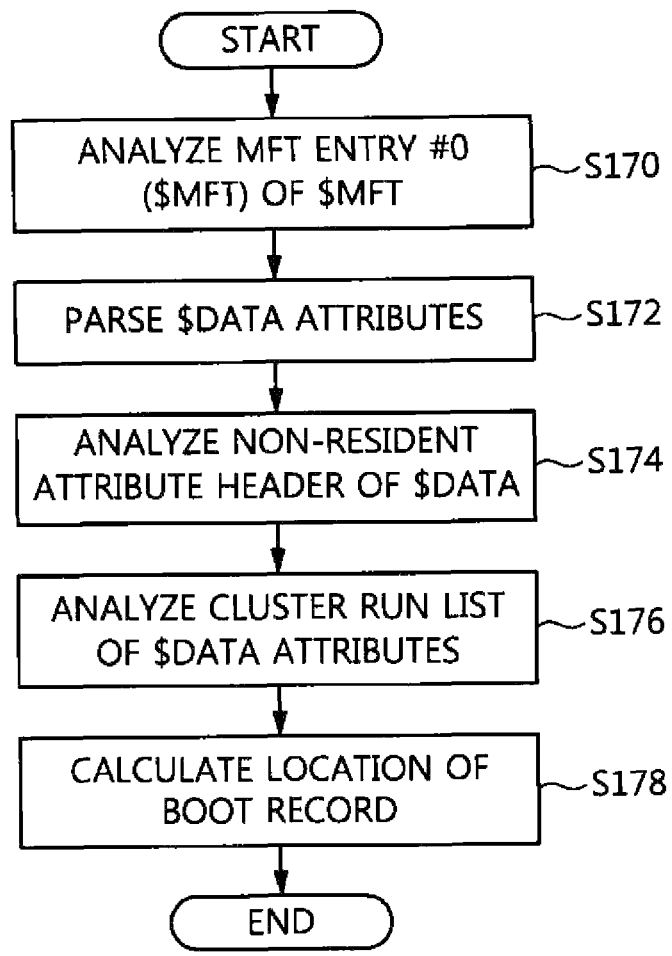
FIG. 9 is a flowchart showing, in greater detail, the step of calculating the location of the boot record in FIG. 8.

FIG. 9 is a flowchart showing in detail the step S154 of calculating the location of the boot record in FIG. 8.

First, the MFT entry #0 of an $MFT file is analyzed at step S170, and then $DATA attributes are parsed at step S172.

Thereafter, the size of the $MFT file (MFTTotalBytes) is obtained based on an item for the real size (offsets 48 to 55) of attribute content in the non-resident attribute header of the $DATA attribute header shown in FIG. 13 at step S174.

Thereafter, by analyzing a Cluster Data Run List (offsets 64 to a variable value) from the non-resident attribute header of $DATA attributes, the starting cluster address (MFTStartClusterOffset) of the $MFT file and the total number of clusters of the $MFT file (MFTTotalCluster) are obtained at step S176.

Next, it is possible to calculate the location of the boot record based on the values obtained at steps S174 and S176 at step S178.

A formula for calculating the location of the boot record is represented by the following equations (1) and (2):

$$MPBytesPerCluster = MFTTotalBytes/MFTTotalCluster \quad (1)$$

where MPBytesPerCluster denotes bytes per cluster used in the recovered MFT partition, MFTTotalBytes denotes the size of the $MFT file, and MFTTotalCluster denotes the total number of clusters in the $MFT file.

$$\text{MPBROffset} = \text{MFTCurrentPhysicalSectorOffset} - (\text{MFTStartClusterOffset} * \text{MPBytesPerCluster}/512 \text{ bytes}) \quad (2)$$

where MPBROffset denotes the physical sector offset address of the boot record of the recovered MFT partition, MFTCurrentPhysicalSectorOffset denotes the physical sector offset of the $MFT file stored as MFT partition candidate information, and MFTStartClusterOffset denotes the starting cluster address of the $MFT file.

Meanwhile, MFTCurrentPhysicalSectorOffset is divided by 512 bytes corresponding to a reference value for normal sectors, and is then calculated as physical sectors. Further, in a disk providing an extended disk scheme, a reference value for sectors may be a multiple of 512 bytes. When a basic unit for sectors differs, calculation is performed in consideration of such a sector unit.

In an example in which the above Equations (1) and (2) are calculated, if MFTTotalCluster denotes 54,080 clusters, and MFTTotalBytes denotes 221,5211,680 bytes, MPBytesPerCluster=221,511,680/54,080=4,096 bytes is obtained, and MPBROffset=6,498,304−(786,432*4,096/512)=206,848 sector offsets is obtained.

That is, the location of the boot record is obtained by converting the starting cluster of the $MFT file (that is, MFTStartClusterOffset) into a sector offset in MFTCurrentPhysicalSectorOffset that is the physical sector offset at the starting location of the $MFT file. Therefore, when a difference between the physical sector offset and the converted sector offset is calculated, the location of the boot record that is the starting point of the volume may be detected. The location of the boot record at this time is the location of sector offsets 206,848 that is a basis of the physical sector. Further, even in the case of the data cluster of $MFTMirr, when a reference value for a Cluster Data Run List is applied to the above Equations, the location of a boot record may be calculated in the same manner, and thus an additional description thereof will be omitted in the present invention.

Figure 10:
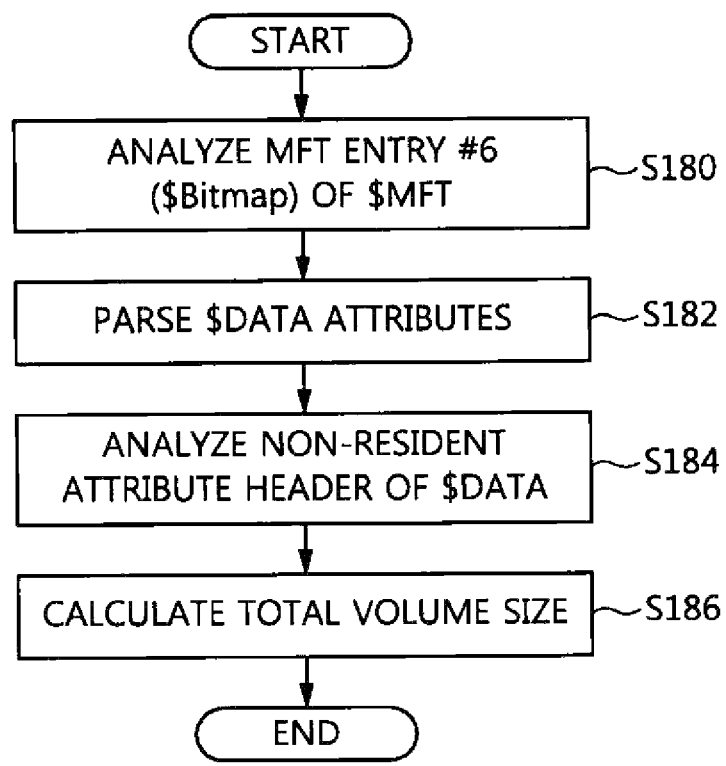
FIG. 10 is a flowchart showing, in greater detail, the step of calculating the size of the volume in FIG. 8.

FIG. 10 is a flowchart showing in greater detail the step S518 of calculating the size of the volume in FIG. 8.

The size of a volume may be calculated by means of $Bitmap that is a metadata file related to the allocation information of the volume among MFT entries or a metadata file such as $BadClus related to the total size of the volume. The term "metadata file" denotes a system file used by the NTFS to manage the volume, and the types of metadata files are illustrated in FIG. 11.

In the following example that will be described, a method of obtaining the volume size using a $Bitmap metadata file will be described.

A $Bitmap file is an MFT entry corresponding to the MFT Identifier (ID) #6 of the $MFT file. Therefore, $DATA attributes are parsed by analyzing the MFT entry corresponding to the MFT identifier #6 of the $MFT file at steps S180 and S182.

Thereafter, the size of $Bitmap (BitmapLogicalSize) is obtained using the real size item of attribute content that is an item corresponding to offsets 48 to 55 of the non-resident attribute header of $DATA attributes in FIG. 13 at step S184.

Thereafter, the total size of the entire volume, that is, the total number of sectors (MPTotalSector) in the volume, is obtained using a characteristic that 1 bit in $Bitmap may be used to determine whether one cluster has been allocated at step S186.

A formula for obtaining the total number of sectors in the volume of a virtually created MFT partition is represented by the following Equations (3) and (4):

$$\text{MPTotalSector} = \text{BitmapLogicalSize} * 8 * \text{MPBytesPetCluster}/512 \text{ bytes} - 1 \quad (3)$$

where MPTotalSector denotes the total sector size of the volume, and BitmapLogicalSize denotes the real byte size of the $Bitmap metafile.

$$\text{MPTotalSize} = \text{MPTotalSector} * 512 \text{ bytes} \quad (4)$$

where MPTotalSize denotes the total byte size of the volume.

By using the data of $Bitmap, 1 byte may represent whether 8 clusters have been allocated. Clusters corresponding to N-th present bytes may be calculated, as shown in FIG. 15. Therefore, the total number of sectors in the volume is calculated by multiplying 8(1 byte=8 bits) by the total size of $Bitmap (byte unit) and additionally multiplying the number of sectors per cluster by a resulting value. There is a need only to subtract one sector from the calculated total number of sectors due to the characteristic that the backup boot record is not included in the total number of sectors in the volume.

In an example in which Equations (3) and (4) are calculated, if BitmapLogicalSize is 20,692,288 bytes, MPTotalSector=20,692,288 bytes*8*4,096/512 bytes−1=1,324,306,431 is obtained, and MPTotalBytes=1,324,306,432× 512=678,044,893,184 bytes is obtained.

That is, the total number of sectors in the volume is 1,324,306,431. If this value is converted into the total capacity (MPTotalBytes), it can be seen that the volume has a size of about 631 GB.

In the above embodiment, when the total number of sectors in the volume is calculated, a description has been made based on the MFT entries of $Bitmap (MFT Identifier #6 metadata), but a formula for calculating the total number of sectors in the volume may also be implemented even using the MFT entries of $BadClus (MFT Identifier #8 metadata) and the MFT entries of dot (.)(MFT Identifier #5 metadata). Therefore, if the MFT entry of $Bitmap is damaged, the total size of the volume may be calculated using the MFT entry of another metadata file.

Values extracted during a procedure for calculating the location of a boot record that has been centrally described in the present invention may be utilized as basic information upon analyzing a file system. A subsequent procedure may be performed such that the file information of MFT entries is parsed and a tree structure of the file system is completed, thus enabling a deleted or destroyed partition to be recovered.

In accordance with the present invention having the above configuration, if all or some of MFT entries remain in a disk or an evidence image (DD, EWF format, etc.) in which a master boot record and a GPT that configure disk information and a boot record and a backup boot record that configure volume information are deleted, core information necessary for the configuration of a volume is calculated using only MFT entry information, and thereafter a virtual volume may be created and may be accessed to the file in the same manner as a normal volume.

Further, the present invention may perform calculation using MFT entry information so as to obtain essential information of a boot record required for analysis of a file system and thereafter recover a partition based on the results of calculation. In particular, the starting location and the total size of a partition may be precisely calculated to configure the entire layout of a volume, so that the location of a cluster in which data of a file is present in the corresponding MFT entry may be precisely accessed, thus enabling the file to be recovered.

Unlike an existing partition recovery technique for performing recovery by searching for a boot record and a backup boot record, the present invention enables the recovery of a partition even if information about a boot record and a backup boot record is not present and only the metadata of a file system is present.

The present invention is advantageous in that the recovery of a partition is possible even if MFT entries are lost and some of MFT entries are present, thus enabling the partition to be recovered using only the information of the remaining MFT entries even if a large amount of core information in a disk is destroyed.

As described above, although the configuration of the present invention has been described in detail with reference to preferred embodiments of the present invention, those skilled in the art to which the present invention belongs will understand that the present invention may be implemented in other detailed forms without changing the technical spirit or essential features of the present invention. For example, the present invention will be implemented in various forms, such as a computer-readable storage medium for storing a program for implementing the partition recovery method according to the present invention. Therefore, the above-described embodiments should be understood to be illustrative rather than restrictive in all aspects. The scope of the present invention should be defined by the scope of the accompanying claims rather than the above detailed description, and all changes or modifications derived from the claims and equivalents thereof should be included in the scope of the present invention.

What is claimed is:

1. A method for recovering a partition based on file system metadata, comprising:
   determining, by an unallocated area determination unit, an unallocated area in a disk or an evidence image;
   collecting, by a Master File Table (MFT) entry collection unit, MFT entries from the unallocated area;
   generating, by an MFT entry analysis unit, MFT partition candidate information by analyzing the MFT entries; and
   creating, by an MFT partition creation unit, information enabling a layout of a partition to be reconfigured based on the MFT partition candidate information, and creating a tree structure using the created information and the MFT entries,
   wherein creating the tree structure comprises:
   reading the MFT partition candidate information and then accessing a corresponding sector;
   analyzing MFT entries of the corresponding sector and calculating a location of a boot record;
   if the location of the boot record has been calculated, calculating a total size of a volume using an MFT entry corresponding to a metadata file;
   determining whether the calculated volume size satisfies a preset minimum size;
   parsing the collected MFT entries if it is determined that the calculated volume size satisfies the preset minimum size; and
   restoring parsed results to a tree structure.

2. The method of claim 1, wherein collecting the MFT entries comprises:
   determining the MFT entries based on a signature of an $MFT file while reading the unallocated area on a sector basis; and
   collecting the MFT entries while jumping by a size of MFT entries if the MFT entries are detected.

3. The method of claim 1, wherein generating the MFT partition candidate information by analyzing the MFT entries comprises:
   analyzing $FILENAME attributes of each MFT entry and then determining whether a file name is "$MFT";
   if it is determined that the file name is "$MFT", determining whether an MFT identifier value of a header of the MFT entry is 0 (zero);
   if it is determined that the MFT identifier value of the MFT entry header is 0 (zero), determining that the $MFT file is present, and determining to which one of a data cluster of $MFT and a data cluster of $MFTMirr the determined $MFT file corresponds; and
   storing, as the MFT partition candidate information, results of determining to which one of the data cluster of $MFT and the data cluster of $MFTMirr the determined $MFT file corresponds.

4. The method of claim 1, wherein calculating the location of the boot record comprises:
   analyzing MFT entry #0 of $MFT;
   accessing $DATA attributes of the MFT entry #0;
   calculating a file size of $MFT from a non-resident attribute header of the $DATA attributes by using a real attribute size item;
   analyzing a Cluster Run List from the non-resident attribute header of the $DATA attributes and obtaining a location value of a starting cluster of the $MFT and a total size value of clusters; and
   calculating a location of the boot record using the location value of the starting cluster of the $MFT and the total size value of the clusters.

5. The method of claim 1, wherein calculating the location of the boot record comprises:
   calculating a difference between a physical sector offset of a file starting location of the $MFT and an offset value obtained by converting the starting cluster of the $MFT into a sector offset, thus calculating the location of the boot record, which is a starting point of the volume.

6. The method of claim 1, wherein calculating the total size of the volume comprises:
   analyzing the MFT entry corresponding to the metadata file;
   obtaining information of the metadata file using a real attribute size item of a non-resident attribute header of $DATA attributes of the MFT entry; and
   calculating a total number of sectors of the volume based on the information of the metadata file.

7. The method of claim 6, wherein the metadata file is an undeleted metadata file from among a $Bitmap file corresponding to MFT entry #6, a dot (.) file corresponding to MFT entry #5, and a $BadClus file corresponding to MFT entry #8.

8. The method of claim 1, wherein determining the unallocated area comprises classifying the disk or evidence image into an allocated area and an unallocated area, and representing each area by Linear Block Addressing (LBA)-based addresses.

9. The method of claim 1, wherein determining the unallocated area comprises classifying the disk or evidence image into an allocated area and an unallocated area, and listing the unallocated area using LBA-based addresses.

10. An apparatus for recovering a partition based on file system metadata, comprising:
an unallocated area determination unit for determining an unallocated area in a disk or an evidence image;
a Master File Table (MFT) entry collection unit for collecting MFT entries from the unallocated area;
an MFT entry analysis unit for generating MFT partition candidate information by analyzing the MFT entries; and
an MFT partition creation unit for creating information enabling a layout of a partition to be reconfigured based on the MFT partition candidate information, and creating a tree structure using the created information and the MFT entries,
wherein the MFT partition creation unit is configured to analyze MFT entries of a corresponding sector by reading the MFT partition candidate information, calculate a location of a boot record, and calculate a total size of a volume using an MFT entry corresponding to a metadata file, and is configured to, if the calculated volume size satisfies a preset minimum size, parse the collected MFT entries and restore parsed results to a tree structure.

11. The apparatus of claim 10, wherein the MFT entry collection unit is configured to determine the MFT entries based on a signature of an $MFT file while reading the unallocated area on a sector basis, and collect the MFT entries while jumping by a size of MFT entries if the MFT entries are detected.

12. The apparatus of claim 10, wherein the MFT entry analysis unit is configured to analyze $FILENAME attributes of each MFT entry, and if it is determined that a file name is "$MFT", determine whether an MFT identifier value of a header of the MFT entry is 0 (zero), and is configured to, if it is determined that the MFT identifier value of the MFT entry header is 0 (zero), store results of determining to which one of a data cluster of $MFT and a data cluster of $MFTMirr an $MFT file corresponds, as the MFT partition candidate information.

13. The apparatus of claim 10, wherein the MFT partition creation unit is configured to access $DATA attributes of the MFT entry #0 of $MFT, calculate a file size of $MFT from a non-resident attribute header of the $DATA attributes by using a real attribute size item, analyze a Cluster Run List from the non-resident attribute header of the $DATA attributes, obtain a location value of a starting cluster of the $MFT and a total size value of clusters, and calculate a location of the boot record using the location value of the starting cluster of the $MFT and the total size value of the clusters.

14. The apparatus of claim 10, wherein the MFT partition creation unit calculates a difference between a physical sector offset of a file starting location of the $MFT and an offset value obtained by converting the starting cluster of the $MFT into a sector offset, thus calculating the location of the boot record, which is a starting point of the volume.

15. The apparatus of claim 10, wherein the MFT partition creation unit obtains information of the metadata file using a real attribute size item of a non-resident attribute header of $DATA attributes of the MFT entry corresponding to the metadata file, and calculates a total number of sectors of the volume based on the information of the metadata file.

16. The apparatus of claim 15, wherein the metadata file is an undeleted metadata file from among a $Bitmap file corresponding to MFT entry #6, a dot (.) file corresponding to MFT entry #5, and a $BadClus file corresponding to MFT entry #8.

* * * * *